(12) United States Patent
Campbell et al.

(10) Patent No.: US 9,784,136 B2
(45) Date of Patent: Oct. 10, 2017

(54) ROTOR TURNING DEVICE FOR LARGE TURBINE/GENERATOR IN-SITU ROTORS

(71) Applicant: SIEMENS ENERGY, INC., Orlando, FL (US)

(72) Inventors: Ira J. Campbell, New Richmond, OH (US); Robert F. Wasileski, Allison Park, PA (US); Johnny R. Dickson, Prosper, TX (US); Gabriel A. Payan, McKinney, TX (US)

(73) Assignee: SIEMENS ENERGY, INC., Orlando, FL (US)

( * ) Notice: Subject to any disclaimer, the term of this patent is extended or adjusted under 35 U.S.C. 154(b) by 158 days.

(21) Appl. No.: 14/507,879

(22) Filed: Oct. 7, 2014

(65) Prior Publication Data

US 2016/0032782 A1 Feb. 4, 2016

Related U.S. Application Data

(60) Provisional application No. 62/030,867, filed on Jul. 30, 2014.

(51) Int. Cl.
*F01D 25/28* (2006.01)
*F02C 7/32* (2006.01)
*F16H 31/00* (2006.01)

(52) U.S. Cl.
CPC .............. *F01D 25/285* (2013.01); *F02C 7/32* (2013.01); *F05D 2230/72* (2013.01); *F16H 31/005* (2013.01)

(58) Field of Classification Search
CPC ........ F01D 25/34; F16H 31/005; F16H 27/02;
F16H 27/04; F16H 29/00; F16H 29/02;
F16H 29/12; F16H 31/00; F16H 31/001;
F02C 7/32; F05D 2230/642
USPC ..... 74/128, 160, 8, 126, 149, 169, 415, 578;
248/646, 648, 649, 651, 652, 654, 664,
248/666; 403/79
See application file for complete search history.

(56) References Cited

U.S. PATENT DOCUMENTS

| | | | | |
|---|---|---|---|---|
| 2,947,187 A | * | 8/1960 | Butts | B65G 23/00 74/128 |
| 3,141,384 A | * | 7/1964 | Hoffman | F01B 9/08 91/178 |
| 3,455,176 A | * | 7/1969 | Lucas | F15B 15/061 74/129 |
| 3,515,009 A | * | 6/1970 | Siegfried | F15B 15/061 74/128 |
| 3,791,229 A | * | 2/1974 | Liedtke | B66D 5/00 405/3 |
| 3,791,231 A | * | 2/1974 | Geary | F01D 25/34 192/104 C |

(Continued)

*Primary Examiner* — William Kelleher
*Assistant Examiner* — Bobby Rushing, Jr.

(57) ABSTRACT

A tool assembly for safely rotating a heavy turbine generator rotor for alignment and maintenance purposes. The tool assembly includes a plurality of segments mounted to an outer face of a coupling affixed to an end of a shaft of the rotor, where the segments include a plurality of segment teeth extending beyond an outer edge of the coupling. A tool is positioned adjacent to the coupling and includes a support assembly, a hydraulic ram and a ratcheting pawl. The ratcheting pawl includes a drive pin positioned to engage the teeth of the segments, where extension of a piston rod from the hydraulic ram causes the coupling and shaft to rotate.

7 Claims, 3 Drawing Sheets

(56) References Cited

U.S. PATENT DOCUMENTS

| | | | | |
|---|---|---|---|---|
| 3,915,064 | A * | 10/1975 | Dancs | F15B 15/061 91/219 |
| 4,018,094 | A * | 4/1977 | Schmidt | F01D 25/34 74/126 |
| 4,776,052 | A * | 10/1988 | Delgado | B65G 69/2823 14/71.3 |
| 4,919,039 | A * | 4/1990 | Nutter | F15B 15/061 74/578 |
| 5,953,958 | A * | 9/1999 | Young | F16H 31/005 74/128 |
| 5,988,065 | A * | 11/1999 | Schroder | F16K 31/52408 101/232 |
| 7,257,910 | B2 * | 8/2007 | Underwood | E02F 3/425 37/403 |
| 7,581,460 | B2 * | 9/2009 | Cooper | C05F 17/02 175/113 |
| 9,394,829 | B2 * | 7/2016 | Cabeen | F02C 7/20 |

* cited by examiner

US 9,784,136 B2

ROTOR TURNING DEVICE FOR LARGE TURBINE/GENERATOR IN-SITU ROTORS

CROSS-REFERENCE TO RELATED APPLICATIONS

This application claims the benefit of the priority date of U.S. Provisional Patent Application Ser. No. 62/030,867, titled, Rotor Turning Device for Large Turbine/Generator In-Situ Rotors, filed Jul. 30, 2014.

BACKGROUND

Field of the Invention

This invention relates generally to a tool for rotating a rotor on a generator for alignment and maintenance purposes and, more particularly, to a tool for rotating a heavy turbine generator rotor for alignment and maintenance purposes, where the tool includes a hydraulic ratcheting pawl supported in a generator housing that engages notched segments in a plate mounted to a shaft coupling.

Discussion of the Related Art

High voltage generators for generating electricity as a power source are well known in the art. A power plant may be of a nuclear or fossil heat source that rotates a shaft by the expansion of a working gaseous fluid across turbine blades that in turn cause the shaft to rotate. The shaft is coupled to an input shaft of a high voltage generator that is mounted to a rotor having a special configuration of coils. An electrical current provided in the rotor coils generates a magnetic flux around the coils, and as the rotor rotates, the magnetic flux interacts with windings in a stator core enclosing the rotor, which generates a current flow in the windings.

Generators of this and other types require periodic maintenance, where the generator is shut down and various maintenance procedures are performed. For example, it is necessary that the shaft of the turbine be accurately aligned with the shaft of the generator rotor during operation of the machines. Therefore, during maintenance of the generator and turbine this alignment between the two shafts is reset, which may require one or both of the rotor shaft and the turbine shaft to be rotated and oriented relative to each other. Because the rotor is often very large and heavy, for example, 200 tons, properly positioning the rotor requires a specific and safe operation to perform the shaft rotation.

The rotor shaft typically includes an end shaft coupling that includes two coupling halves that are bolted together. During the maintenance operation, the coupling halves are separated, which exposes the bolt holes in each coupling half that are used to secure the coupling halves together. In one known procedure, a machine pin is inserted into one of these holes. A cable is then wrapped around the pin and coupled to an overhead crane hook. By lifting the crane hook, rotary motion can be applied to the rotor. However, there are safety risks associated with this procedure to personnel and equipment. For example, the cable may break if not correctly selected, possibly putting personnel in physical harm. Further, the rotor may continue rolling and once past center with momentum, the cable may be overloaded and break. Also, the crane hook may be overloaded, damaged or require downtime to inspect before continued operation. Further, the pin inserted into a coupling bolt hole may bend and, if overloaded, may damage the coupling bolt hole. In an alternate embodiment, a machine pin is also placed in one of the coupling half holes, a hydraulic ram is set under the pin and pressure is exerted against the pin causing rotor rotation. Access is generally limited and many pinch points are encountered making this method also a safety concern.

SUMMARY OF THE INVENTION

The present disclosure describes a tool assembly for safely rotating a heavy turbine generator rotor for alignment and maintenance purposes. The tool assembly includes a plurality of segments mounted to an outer face of a coupling affixed to an end of a shaft of the rotor, where the segments include a plurality of segment teeth extending beyond an outer edge of the coupling. A tool is positioned adjacent to the coupling and includes a support assembly, a hydraulic ram and a ratcheting pawl. The ratcheting pawl includes a drive pin positioned to engage the teeth of the segments, where extension of a piston rod from the hydraulic ram causes the coupling and shaft to rotate.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a turning tool for rotating a rotor of a generator for maintenance and alignment purposes is merely exemplary in nature, and is in no way intended to limit the invention or its applications or uses.

Figure 1:
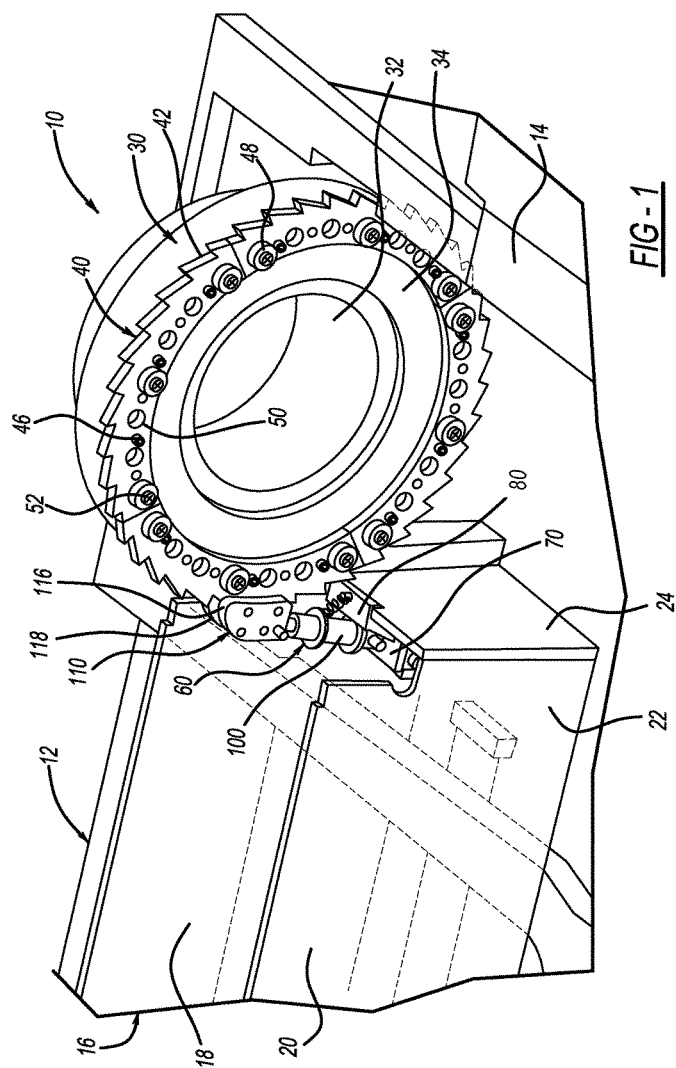
FIG. 1 is an isometric view of an assembly including a rotor shaft coupling, a generator housing and a rotor turning tool.

FIG. 1 is an isometric view of an assembly 10 showing a portion of components and structural members associated with a high power electrical generator of the type referred to above. The assembly 10 includes a portion of a generator housing 12 including a housing frame 14 that provides support for a turbine shaft (not shown). The housing 12 also includes an enclosure 16 having sidewalls 18 and 20, a floor plate 22 and a vertical structural member 24 in which is positioned and supported various generator components, such as gears, bearings, oil devices, etc., none of which are shown.

The assembly 10 also includes a shaft coupling 30 that is actually a shaft coupling half of the type referred to above. The shaft coupling 30 includes an internal bore 32 in which is permanently affixed a rotor shaft, which has been removed from the assembly 10 for clarity purposes. The shaft coupling 30 also includes a front face 34 to which the other shaft coupling half (not shown) is mounted, where the generator including the rotor would be positioned at an opposite side of the coupling 30.

As will be discussed in detail below, the present invention proposes a tool assembly for rotating the coupling 30, which in turn rotates the rotor shaft and thus the rotor for alignment purposes with the turbine shaft during a maintenance operation. Part of the tool assembly includes a number of notched segments 40 mounted to the front face 34 of the coupling 30 and forming a ring, where each segment 40 includes a series of teeth 42 that extend beyond the outer edge of the coupling 30. In this non-limiting embodiment, there are four of the segments 40 so as to satisfy weight limitations necessary for proper handling. The shaft coupling 30 includes a series of holes extending around the circumference of the coupling 30 that allow it to be bolted and attached to the other coupling half. Those holes are used to mount the segments 40 to the front face 34 of the coupling by, for example, a number of mounting bolts 46. In this non-limiting example, each of the segments 40 is mounted to the coupling 30 using three of the bolts 46. Further, there are a number of holes 50 in the coupling 30 that accept alignment pins (not shown) provided between the coupling halves. Fitted drive pins 48 are inserted into these holes for accepting the turning force provided by the tool assembly, as will be described in detail below. Each of the pins 48 includes a center retaining screw 52 that maintains the pin axial position. In this non-limiting example, each of the segments 40 includes three drive pins 48, where other of the holes 50 in the segments 40 are available to accept other drive pins for other applications if necessary.

Figure 2:
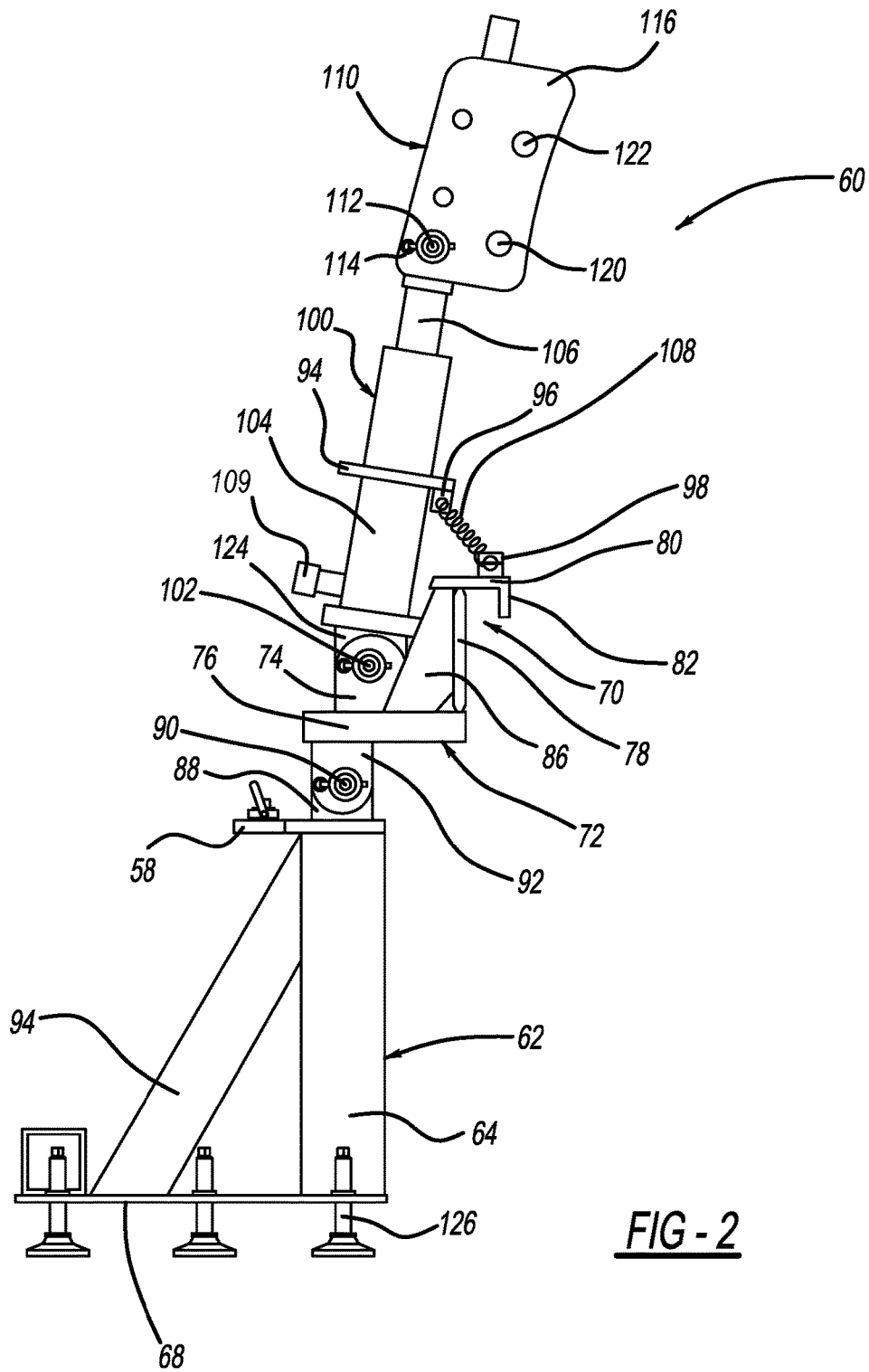
FIG. 2 is a side view of the rotor turning tool shown in FIG. 1.
Figure 3:
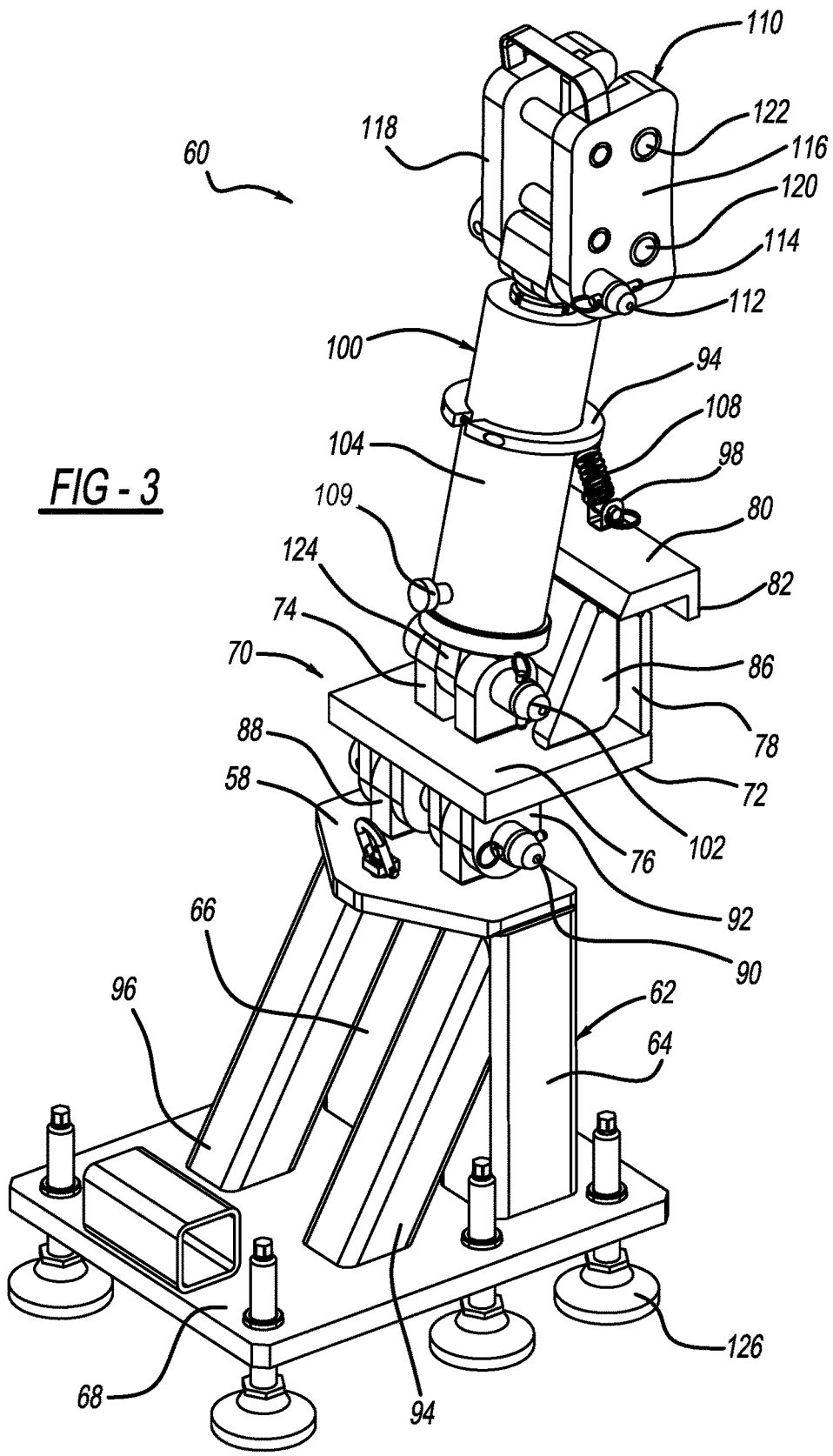
FIG. 3 is a back isometric view of the rotor turning tool shown in FIG. 1.

The assembly 10 also includes an alignment tool 60 that is positioned within the enclosure 16 and is part of the tool assembly, where a side view of the tool 60 is shown in FIG. 2 and a back isometric view of the tool 60 is shown in FIG. 3 removed from the assembly 10. The tool 60 operates to rotate the coupling 30 in a ratcheting and pawl configuration, as will be discussed in detail below. The tool 60 includes a lower support 62 having a pair of side-by-side vertical rectangular posts 64 and 66 and a pair of side-by-side angled rectangular posts 94 and 96 all secured to a base plate 68 and a top plate 58. The lower support 62 further includes two spaced apart mounting rings 88 secured to the top of the top plate 58, as shown. The tool 60 also includes an upper support 70 having an L-shaped portion 72 including a bottom plate 76, a vertical plate 78 and a pair of spaced apart support brackets 86. The upper support 70 also includes a horizontal restraint bar 80 mounted to the vertical plate 78 and including a front flange 82. The upper support 70 further includes four spaced apart mounting rings 92 secured to the bottom of the bottom plate 76, as shown. The upper support 70 is secured to the lower support 62 by a pivot pin 90 extending through the mounting rings 88 and 92, as shown. The upper support 70 also includes two spaced apart mounting rings 74 secured to the top of the bottom plate 76, as shown.

The tool 60 further includes a hydraulic ram 100 having a mounting ring 124, where the ram 100 is secured to the upper support 70 by a pivot pin 102 extending through the mounting rings 74 and 124. The hydraulic ram 100 includes a cylinder 104 from which extends a piston rod 106 that is pushed out of the cylinder 104 by hydraulic pressure from a hydraulic line coupled to a coupling 109. The rod 106 is fully retracted into the cylinder 104 in FIG. 3. A tension ring 94 including a spring anchor point 96 is provided on the cylinder 104 and a spring anchor point 98 is provided on the horizontal bar 80, where a spring 108 is connected to the anchor points 96 and 98. A ratcheting pawl 110 is mounted to an end of the piston rod 106 opposite to the cylinder 104 by a pivot pin 112 including a retainer 114. The ratcheting pawl 110 includes opposing plates 116 and 118 between which the piston rod 106 is mounted and the pivot pin 112 extends. A drive pin 120 is mounted to and extends between the plates 116 and 118 at a lower end of the ratcheting pawl 110 adjacent to the pin 112, as shown, and a reaction pin 122 is mounted to and extends between the plates 116 and 118 at an upper location of the ratcheting pawl 110.

The tool 60 is positioned within the enclosure 16 adjacent to the vertical support member 24, as shown in FIG. 1. During installation of the tool 60, the lower support 62 is placed in the enclosure 16 on the floor plate 22. The upper support 70 is then placed on top of the lower support 62 and secured thereto by the pin 90 extending through the rings 88 and 92. The restraint bar 80 is latched over the vertical support member 24 so that the flange 82 is positioned on an outside surface of the member 24, as shown. The tool 60 is then set level by adjusting height and leveling a number of screw pads 126, here six pads, under the plate 68. In this configuration of the tool 60, the upper support 70 is resting on top of the vertical support member 24 and will be restrained horizontally by the flange 82 positioned against the vertical support member 24. Once the upper support 70 and the lower support 62 are in their proper position, the ratchet pawl 110 is rotated on the pin 112 so that the drive pin 120 engages one of the teeth 42 on one of the segments 40 that is currently in the proper position. When the drive pin 120 engages one of the teeth 42, the reaction pin 122 will engage the tooth 42 directly above it. The drive pin 120 supports the load of the rotor shaft and the reaction pin 122 holds the ratcheting pawl 110 at the proper angular orientation as the coupling 30 rotates.

When hydraulic pressure is provided to the ram 100, the piston rod 106 extends forcing the drive pin 120 against the tooth 42 causing the coupling 30 and shaft to rotate in the clockwise direction. As the piston rod 106 is being extended, the ratchet pawl 110 will rotate on the pin 112 and the hydraulic ram 100 will rotate on the pin 102. When the rod 106 reaches the end of its travel, it is retracted. The tension provided by the spring 108 forces the ratcheting pawl 110 against the notch segment 40 when the piston rod 106 is being retracted into the cylinder 104, where the spring tension can be manually adjusted during operation by moving the tension ring 94 up and down on the cylinder 104.

During operation of the tool 60, the size and weight of the rotor causes significant force to be put on the tool 60. Because of the geometry of the upper support 70 there is only a vertical load on the lower support 62 and on the vertical structural member 24. Particularly, the vertical offset of the position of the pivot pins 90 and 102, as shown, causes approximately 80% of the hydraulic ram load to be on the lower support 62 and approximately 20% of the load to be on the vertical structural member 24. This split loading provides exceptional stability along with the horizontal restraint bar 80 for the hydraulic ram 100.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A tool assembly operatively connected to and rotating a shaft of a rotor associated with a high power generator, said rotor shaft including a shaft coupling mounted at an end thereof, said tool assembly comprising:
   at least one segment mounted to an outer face of the coupling, said at least one segment including a plurality of segment teeth extending beyond an outer edge of the coupling;
   a tool positioned adjacent to the coupling, said tool including a lower support and an upper support secured together by a first pivot pin, said upper support having an L-shaped portion comprising a bottom plate and a vertical plate, and including a horizontal load bar mounted to the vertical plate, the horizontal load bar configured to be positioned on a vertical support member such that the upper support rests on top of the support member, said tool further including a hydraulic ram secured to the upper support by a second pivot pin, said hydraulic ram including a piston rod, said tool further including a ratcheting pawl mounted to the piston rod by a third pivot pin, said ratcheting pawl including a drive pin positioned to engage the teeth of the at least one segment, where extension of the piston rod from the hydraulic ram causes the coupling and shaft to rotate; and a tensioning member mounted to the hydraulic ram and the horizontal load bar and being configured to provide tension to hold the ratcheting pawl to the segment as the piston rod is being retracted.

2. The tool assembly according to claim 1 wherein the vertical support member is a wall of a generator housing.

3. The tool assembly according to claim 1 wherein the position of the first pivot pin coupled to the upper and lower supports and the vertical offset of the position of the second pivot pin coupled to the upper support and the hydraulic ram is selected so that a higher percentage of a vertical load from the shaft is on the lower support than on the vertical support member.

4. The tool assembly according to claim 3 wherein the position of the first and second pins causes about 80% of the vertical load to be on the lower support and about 20% of the vertical load to be on the support member.

5. The tool assembly according to claim 1 wherein the ratcheting pawl includes a reaction pin mounted to a separate one of the teeth than the drive pin and being configured to hold the ratcheting pawl in place as the coupling rotates.

6. The tool assembly according to claim 1 wherein the at least one segment is four segments mounted to the front face of the coupling to form a ring.

7. The tool assembly according to claim1 further comprising a plurality of support pads mounted to the lower support, said support pads being adjustable so as to level the tool.

* * * * *